United States Patent Office 3,586,744
Patented June 22, 1971

3,586,744
METHOD OF PREPARING A FUEL PLATE CONTAINING LOW DENSITY FUEL PARTICLES
Leonard Vincent Triggiani, Silver Spring, Moises Gali Sanchez, Severna Park, and George Elliott Ashby, Highland, Md., asssignors to W. R. Grace & Co., New York, N.Y.
Filed Feb. 28, 1968, Ser. No. 710,707
Int. Cl. G21c 21/00
U.S. Cl. 264—.5                                                        5 Claims

ABSTRACT OF THE DISCLOSURE

A process for improving the fuel-bearing phase of a dispersion type nuclear fuel plate, in which individual foils are impressed with cells of controlled dimension and shape in a regular array, and fuel particles having a density of about 50% of theoretical, containing the fissile materials, are inserted in the cells by vibration, compression, suction or other means. The foils are then laminated to additional fuel-bearing foils and outer foils that contain no fissile material and then compressed to yield a unitized fuel plate with the fuel particles dispersed uniformly throughout.

---

The use of heterogeneous fuels, the system in which the particles of fissile material are dispersed in or surrounded by a fuel free matrix is growing rapidly. This system provides a structure in which fuel-bearing particles are present as individual small cells of fuel, each encapsulated within a matrix. The resulting composite is more stable under radiation than comparable homogeneous fuel materials because the operating life is increased through localization of fission fragment damage.

In this system, the damage produced by fission fragments is restricted to the fuel-bearing particle and coating material, if present, plus the surrounding matrix to a distance equal to the recoil range of the matrix material. In most solids, the recoil range is quite small, in the order of a few microns. Since this range is small, a fuel material can be designed in which the inter particle distance is greater than twice the recoil range, thus providing a matrix region undamaged by recoils during irradiation. A structural skeleton is thus provided that will maintain integrity as the fuel is consumed.

In one such system, a plate composed of zirconium, aluminum, stainless steel, zircalloy, graphite, beryllia, alumina, aluminum alloys, or other metals with the fissionable material dispersed throughout has proved to be a reliable fuel form. Uranium dioxide has a high melting point, high density and has been a stable uranium chemical form. The metal plates or non-metallic strips such as beryllia, graphite, or alumina have provided stability, corrosion resistance, adequate or superior heat transfer properties, a lack of reactivity with $UO_2$ and other fissionable fuel particles, an inherent strength at high temperature and neutron fluxes. In addition, the properties of these metals and non-metals have made them potentially desirable as matrix materials for providing fuel loadings in the desired range.

Figure 1:
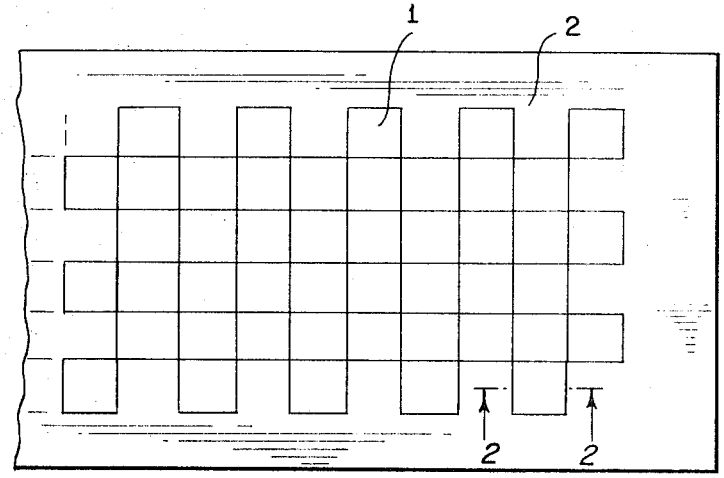
Figure 2:
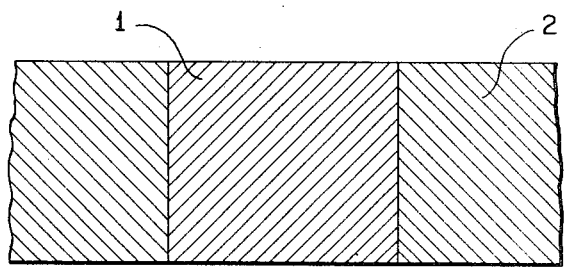
Figure 3:
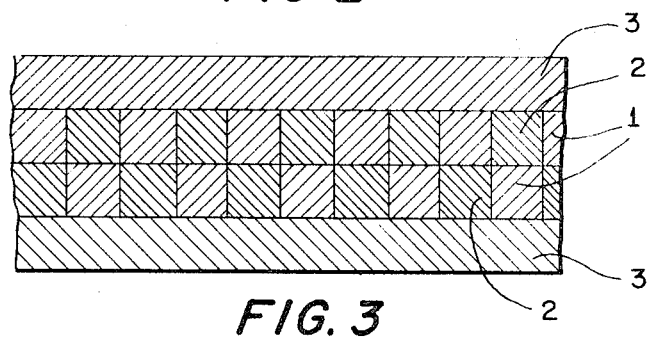

In order that the character of the foil and the plates prepared therefrom may be better understood, reference should be made to the sheet of drawings in which the foils and fuel plates produced according to this invention are illustrated. FIG. 1 is a top view of an individual foil showing a close-packed array of cells after the foil has been compressed. The individual cell 1 is shown as completely filled by the compressed microsphere. FIG. 2 is a cross section of FIG. 1 along the line 2—2. It shows the microsphere 1 compressed to take up all the space in the cell and shows the unperforated section of the plate at 2. FIG. 3 is a cross sectional view of a typical fuel plate. The compressed microspheres 1 are positioned in a definite relationship to the unperforated portion of the foil 2. The top and bottom foils 3 are shown in their position in a finished fuel plate.

The prior art methods of fabrication of dispersion fuels embody blending coated particles with a powdered precursor of the matrix material. Mixing in this manner results in a non-uniform distribution of the spherical fuel material and in the matrix material. This non-uniformity is a serious drawback and is especially marked when the spherical fuel particles and the matrix precursor powder are of widely different particle sizes and shapes. Non-uniformity is also a serious problem when it is desirable to mix the fuel with additional components such as burnable poisons, coated boron carbide particles, for example. Even under the most ideal mixing conditions, a certain amount of non-uniformity of particle distribution is inherent in this method owing to the wide distribution of sizes of the spherical fuel materials themselves as obtained by classical ceramic processing techniques.

During the mixing operation, fuel particles sometimes come in violent contact with each other. This leads to rupture of the particle coating and release of the fuel material into the matrix precursor. This may lead to rejection of the finished fuel element for poor quality. The released fuel would contaminate the matrix in the final fuel element and result in hot spot formation, damage to the matrix material and fission product release. Often such defects are undetected prior to loading a fuel element in a reactor. Fuel element failure during reactor operation leads to contamination of the coolant, the reactor environment and eventual reactor shutdown.

During the mixing operation, and the pressing and compaction operations which follow, the geometric non-uniformity of particle distribution and particle sizes and shapes often leads to violent collision between spherical particles which result in flattening and distention of the coated particles in such a manner as to produce stringering and micro cracks in the final fuel element. This behavior leads to the formation of hot spots in a reactor and also to the formation of cracks in the fuel element which result in fission product contamination of the fuel element matrix and the fuel element environment.

The introduction of microspheres such as are described in U.S. Pat. 3,331,785, has resulted in substantial improvements in fuel technology. This application and copending applications S.N. 710,708 and 710,709, filed of even date herewith, cover processes for utilizing these microsphere materials in fuel plates.

The microspheroidal particles described in U.S. Pat. 3,331,785, have unique physical and chemical properties that make them particularly desirable in the preparation of fuel plates. Although "microspheres" have been prepared by other described techniques, the particles prepared by these techniques do not have the desirable set of chemical and physical properties necessary for preparation of the fuel plates of our invention.

The spheres prepared according to the process described in U.S. Pat. 3,331,785, are highly spherical and can be produced in very closely controlled size ranges. Since this is the case, an array of cells of regular size and shape can be fabricated to accommodate these spheres. This is not possible where the particles have irregular sphericity and vary widely in size.

Since few of these spheres vary from sphericity, they can be more easily coated than poorly shaped particles. The coatings on these particles are uniform and have an excellent retentivity of fission products. Because the surface texture is smooth, the coatings are strong and have no tendency to weaken during fabrication or use in a reactor.

One of the principal problems encountered in the prior art microspheres characterized by poor sphericity and irregular surface results from the tendency of uranium to migrate through the coating at points where surface irregularities exist.

In the classical process of sphere formation, high temperatures are required to spheroidize the irregular shaped particles and to achieve composition uniformity or solid solution in binary or multicomponent systems. There high temperatures are incompatible with low density (50% to 80% of theoretical). In the process described in the 785 patent, solid solution and spheroidization is achieved in materials that have been treated at temperatures of 80 to 100° C.

These microspheres can be prepared in sizes from about 50 to 3,000 microns having a close size distribution in this range.

This application is limited to discussion of the special problems that arise in the preparation of the fuel particles having a density of about 50% of theoretical. The microspheres can be prepared to contain other materials such as zirconia, for example, that improve the physical properties of the actinide oxide fuels. The microsphere route also provides a convenient method of introducing nuclear poisons such as samarium, for example, into the fuel if desired.

It is an object of this invention to prepare fuel elements in the form of plates having void space within the particle for fuel particle expansion.

It is a further object of this invention to prepare fuel elements in the form of plates that have void space within the particles to effect fission particle collection.

For purposes of this application the spaces in the foils occupied by the microspherical fuel elements are designated cells. Each of these cells has a critical dimension the diameter of the cell is the same as the thickness of the foil, and the diameter of the microsphere as loaded into the individual foil. This provides a uniform distance between the spheres.

The most advantageous arrangement of these cells in the fuel plate is the close-packed array. In this system, the cells in individual plates are positioned in the manner such that, when the plates being used in the matrix are assembled, the fuel microspheres are in contact with the matrix metal at the top and bottom as well as at the sides of the individual cells. The critical dimension of the cells is such that each of the fuel particles are separated from the adjoining fuel particle by a distance equal to the diameter of the fuel particle.

The first step of the process of preparing these fuel plates is the selection of a matrix material. The plates can be metals such as aluminum, aluminum alloys, stainless steel, various Zircalloy metals, as well as zirconium metal. In addition, the matrix material may be essentially nonmetallic. It may be made up of graphite, beryllia, or alumina.

After the matrix material has been selected, the next step in the process is the impression of the individual cells in each of the foils. This may be accomplished by any suitable technique such as drilling, forging, casting, or etching. One of the problems encountered in drilling is the presence of burrs in the finished product. This problem can be overcome by the technique known as double drilling where the drill is run into the foil and the foil is reversed and the drill passed through the foil from the reverse side. Another convenient method of preparing these plates is the etching technique, particularly when the plate used to prepare the matrix material is a low cost metal that reacts vigorously with mineral acids.

In this technique, the plate, such as an aluminum plate, for example, is covered with a plastic material. The plastic is disintegrated in a definite pattern using a light source, for example, and the metal dissolved away from the areas not having a plastic coating by an acid or other similar etchant. In the final step of the process, the etchant is washed away, the plastic removed, and the plate is ready for loading and assembling into the fuel element.

In the next step of the process, the microspheres are positioned in the individual foils. This loading can be accomplished by vibration, pressing, or any other suitable means.

The process of this application is limited to that special case where the individual fuel particles have a density of about 50%. Since this is the case, the individual particles are quite porous and thus have void space in the individual particles for fission product release. In addition, any expansion of the particles can be taken up by slight compression of the particles in the individual cells.

Since it is generally desirable to exclude air from the space in the cells not occupied by the particles as well as from the porous fuels themselves, this bonding is most advantageously done under vacuum or in the presence of an inert gas such as nitrogen, helium, argon, etc. The foils are bonded to each other and to outer foils to prepare the bonded plate. The configuration after compression is shown graphically in FIG. 2. The void spaces in the individual cells as shown in FIG. 1 are removed by compression.

Our invention is further illustrated by the following specific, but non-limiting examples.

EXAMPLE I

In this example a stainless steel matrix is made up to have a critical dimension of 60 mils. The fuel plate is prepared to have 4 fuel-bearing foils and 2 outer foils that contain no fuel-bearing material. The fuel in the individual foils has a density of about 50% of theoretical.

Fuel-bearing foils were prepared by drilling holes 60 mils in diameter in an aluminum foil 60 mils thick to form the individual cells in these foils. The cells were loaded with urania fuel having a density of 50% of theoretical.

Four fuel-bearing foils were prepared in this manner. These foils were bonded to outer foils 120 microns in thickness to form the fuel plates.

The plates are bonded using the following technique.

The metal is initially cleaned in hexane which is a degreasing bath. Firts they are degreased in hexane, then they are mechanically abraded with 60 grit silicone carbide abrasive paper. The parts are then scrubbed in a solution of Alconox for 5 minutes at 200° F., and ultrasonically cleaned in an Alconox bath for 5 minutes at 165° F. They are then rinsed in warm distilled water and brushed clean in warm distilled water, followed by immersion in a 3% HCl solution at room temperature for 5 minutes. They are then rinsed twice in warm distilled water. They then are blown dry with filtered argon.

We coat the surfaces of the mild steel that will come in contact with the metal during bonding with a thin coat of Aquadag and vacuum bake at 750° C. for 30 minutes, cool to room temperature and then wipe off excess carbon residue. The metal parts are then placed in the mild steel containers. Copper chill blocks are placed over the containers and the containers are sealed except for a small corner by heli-arc welding techniques in an inert atmosphere chamber. Final sealing is performed in an electron beam welding chamber.

Gas pressure bonding was performed at 2100° F. at 10,000 p.s.i. for 3 hours. The parts were then removed from the mild steel containers by selective leaching in nitric acid. The bonded materials were examined nondestructively by liquid crystal technique.

EXAMPLE II

This example shows the preparation of Zircalloy 2 plate wherein the critical dimension is about 6 mils. The fuel contains an alloy material and has a density of about 50%.

The fuel-bearing plates are prepared using the technique described in Example I. The cells in the Zircalloy plates were filled with a urania fuel containing an alloying agent that had a density of 50% of theoretical. The outer foils (12 mils thick) were positioned on the assembly. Bonding was effected using the technique assembled in Example I.

EXAMPLE III

This example shows the preparation of a fuel plate wherein the matrix material is graphite. The critical dimension is about 6 mils. The fuel is uranium nitride coated with a carbide coating. This example also illustrates the use of special fuels in the preparation of these plates.

A fuel plate is prepared using the general technique described in Examples I and II. The cells in the graphite fuel-bearing plates are loaded with uranium nitride coated with uranium carbide to a thickness of 25 microns.

EXAMPLE IV

This example shows the preparation of a tungsten plate having a critical dimension of 6 mils. The fuel is again a special fuel, uranium nitride, that is not coated.

A fuel plate is prepared using the technique described in Example I. The fuel-bearing foils are loaded with uncoated uranium nitride.

Obviously, many modifications and variations of the invention can be made without departing from the essence and scope thereof and only such limitations should be applied as indicated in the appended claims.

What is claimed is:

1. A process for directly forming a fuel assembly suitable for use in a nuclear reactor which comprises perforating a foil of zirconium, aluminum, stainless steel, aluminum alloys, graphite, alumina, or beryllia, to form a series of cells of controlled size and dimension, inserting sintered microspheres of uniform size of a fissile material having a density of about 50 to 80 percent of theoretical in said cells, bonding by pressing and welding said foil to additional fuel-bearing foils and to unperforated plates positioned at the top and bottom of the assembly, reducing the thickness of the resulting laminate and recovering the product assembly.

2. The process according to claim 1 wherein the microspheres are of a fissile material selected from the group consisting of $U^{-235}$, $Pu^{-239}$, and $U^{-233}$ and have a size in the 50 to 1600 micron range.

3. The process according to claim 1 wherein the void volume in the cells is reduced by about 25 to 50%.

4. The process according to claim 1 wherein the void volume in the cells is reduced by greater than 90 percent.

5. The process according to claim 1 wherein the cells are loaded with microspheres of uranium nitride or uranium carbide.

References Cited

UNITED STATES PATENTS

| | | | |
|---|---|---|---|
| 2,491,320 | 12/1949 | Koontz | 264—.5X |
| 2,996,443 | 8/1961 | Schaner | 176—75 |
| 3,088,884 | 11/1961 | Schippereit et al. | 176—86 |
| 3,097,152 | 7/1963 | Walker | 176—75X |
| 3,103,478 | 9/1963 | Kooistra | 176—86 |
| 3,141,227 | 7/1964 | Klepfer et al. | 176—86X |
| 3,270,412 | 9/1966 | Vordahl | 29—472.3 |
| 3,368,261 | 2/1968 | Pauls | 29—480X |

REUBEN EPSTEIN, Primary Examiner

U.S. Cl. X.R.

29—191.2, 472.3; 176—68, 75; 156—250